United States Patent [19]
Nakamura et al.

[11] 4,137,090
[45] Jan. 30, 1979

[54] METHOD FOR CONTROLLING OPERATION OF APPARATUS FOR PREHEATING AND CALCINING CEMENT MATERIALS CONTAINING COMBUSTIBLE MATERIALS

[75] Inventors: Norio Nakamura, Omiya; Satoshi Tominaga, Tama; Tsuneo Kobayashi, Ichikawa; Mitsuo Nagaoka, Higashikurume, all of Japan

[73] Assignee: Ishikawajima-Harima Jukogyo Kabushiki Kaisha, Ote, Japan

[21] Appl. No.: 782,756

[22] Filed: Mar. 30, 1977

[30] Foreign Application Priority Data

Apr. 6, 1976 [JP] Japan .................................. 51-37840

[51] Int. Cl.² ................................................ C04B 7/02

[52] U.S. Cl. ...................................... 106/106; 106/103
[58] Field of Search ................................. 106/100, 103

[56] References Cited

U.S. PATENT DOCUMENTS 3,091,443   5/1963   Herz et al. ........................... 106/100

Primary Examiner—James Poer
Attorney, Agent, or Firm—Scrivener, Parker, Scrivener & Clarke

[57] ABSTRACT

Disclosed is a method for controlling the operation of an apparatus for preheating and calcining cement materials. Noncombustible cement materials are introduced into a preheater while cement materials containing combustible materials, into a calciner immediately at the downstream of the preheater.

2 Claims, 3 Drawing Figures

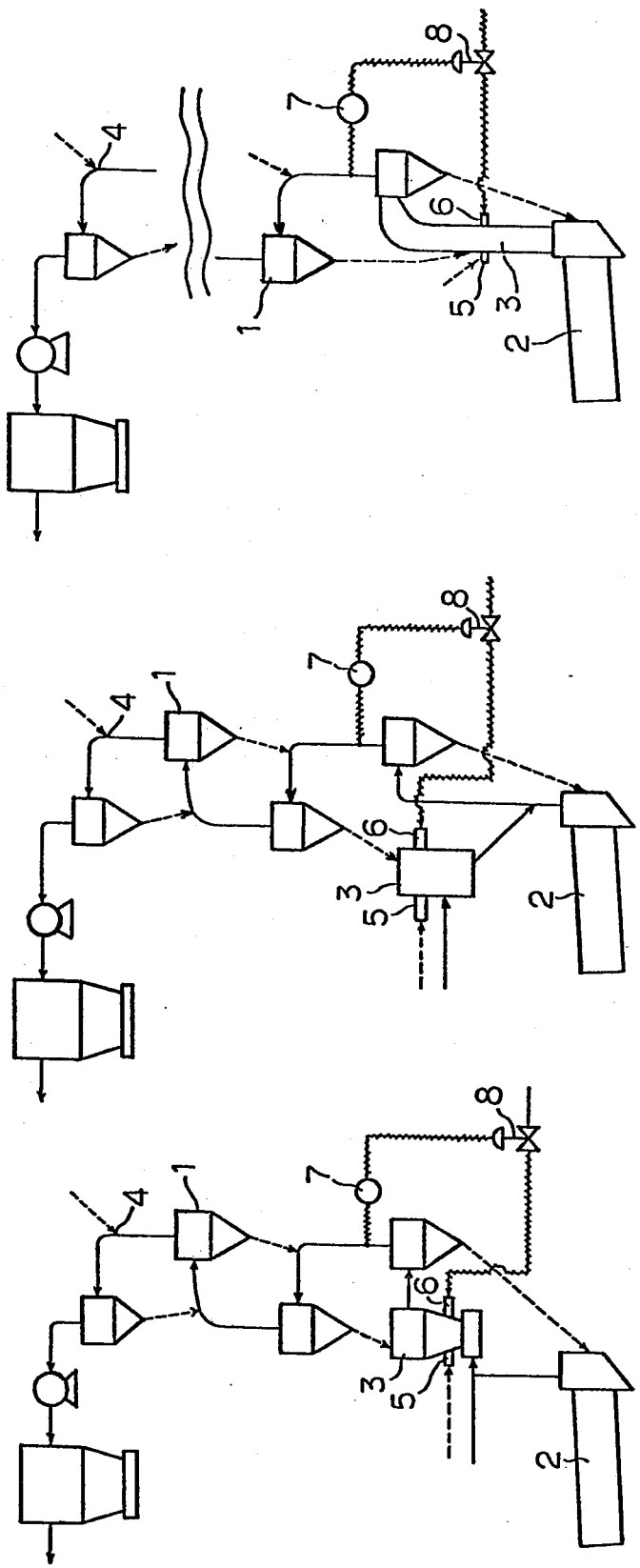

METHOD FOR CONTROLLING OPERATION OF APPARATUS FOR PREHEATING AND CALCINING CEMENT MATERIALS CONTAINING COMBUSTIBLE MATERIALS

DETAILED DESCRIPTION OF THE INVENTION

In order to calcine finely ground materials and particularly cement materials, there has been recently invented and demonstrated a new suspension preheater system wherein a calciner with burners is provided as a lowermost stage in order to increase the capacity of the prior art systems. There has been also devised and demonstrated a cement manufacturing method wherein raw cement materials containing combustible materials such as oil shales are used as one of the components as clayey materials are and burned in order to make full use of the heat produced by the combustion of the combustible materials.

The present invention has for its object to provide a method for automatically controlling the heat required for calcining raw cement materials, and variation in that heat is dependent upon the mixing ratio of the combustible materials and upon the heat generated by the combustion of the combustible materials (to be referred to as "the heating value" for brevity in this specification) so that the quality of cement clinker may be suitably controlled and the use of raw cement materials containing combustible materials may be permitted.

In the prior art cement manufacturing processes equipped with a suspension preheater, calcareous and clayey materials are mixed at a suitable ratio, pulverized and introduced into an uppermost stage of the preheater system. When the materials containing combustible materials such as oil shales are mixed as the clayey materials with other raw materials, ground and charged into the suspension heater, the combustion materials are evaporated and discharged out of the preheater in exhaust gases so that the heat recovery and utilization is impossible. In addition, there is assumed to be a bad case that the combustible materials in the exhaust gases charged into the electrostatic precipitator would cause the explosion of the electrostatic precipitator. Therefore, it is good that the raw cement materials containing combustible materials (to be referred to as "the combustible materials" for brevity in this specification as contrasted with the "noncombustible raw cement materials") are directly charged into a high temperature calciner or the like in order to recover and utilize the heat, but so far there has been a problem that the stable operation cannot be attained because of the variation in temperature in the calciner which in turn is caused by the variation in mixing ratio of the combustible materials decided for the cement quality and the variation of their heating value.

To solve this problem the present invention provides an auxiliary combustion device or burner for the calciner whose combustion speed of fuel is automatically controlled in response to the temperature in the calciner so that the variation in temperature in the calciner due to the variation in mixing ratio of the combustible materials may be minimized and consequently the stable and safe operation may be ensured. More specifically, the cement burning apparatus consumes about 800 Kcal per kilogram of clinker, and of 800 Kcal, 450 to 500 Kcal is used for the preheating and calcination of raw cement materials. According to the present invention in order to supply part of the heat required for preheating and calcination the combustible materials such as oil shales are mixed with raw cement materials in such a way that the heating value may be less than 400 Kcal per kilogram of clinker. The combustible materials are directly charged into the calciner with the auxiliary burner so that the heat generated by the combustion of combustible materials may be fully utilized. The additional heat of about 50 to 100 Kcal is supplied by the combustion of fuel by the auxiliary burner in the calciner. The variation in necessary heat in the calciner which is caused by the variation in mixing ratio of combustible materials and the variation in their heating value is detected in terms of the temperature of gases discharged at an outlet of the calciner, and in response to the temperature detected, the combustion speed of the fuel of the auxiliary burner is automatically controlled.

The above and other objects, features and advantages of the present invention will become more apparent from the following description of three preferred embodiments thereof taken in conjunction with the accompanying drawings, in which:

FIGS. 1, 2 and 3 are diagrammatic views of first, second and third embodiments, respectively, of the present invention.

Same reference numerals are used to designate similar parts throughout the figures.

First Embodiment, FIG. 1

Referring to FIG. 1, reference numeral 1 designates a suspension preheater; 2, a rotary kiln or firing furnace; 3, a calciner; 4, an inlet of noncombustible cement materials; 5, an inlet of combustible cement material; 6, an auxiliary burner for the calciner 3; 7, a temperature sensor for sensing the temperature of gases passing through an upper gas passage of a lowermost stage cyclone in order to indirectly measure the temperature of gases exhausted from the calciner 3; and 8, a fuel flow control valve inserted in a fuel supply pipe to the auxiliary burner 6 for controlling the flow rate of fuel in response to the output signal from the temperature sensor 7.

In the first embodiment, the cement material contains combustible materials such as oil shales. The combustible cement materials and the noncombustible cement materials are crushed and ground independently of each other and weighed in such a way that when they are mixed, the mixture may have a predetermined mixing ratio. The noncombustible cement materials or calcareous materials are charged into the suspension preheater 1 through the inlet 4 as in the prior art methods whereas the combustible materials are directly charged into the calciner 3 through the inlet 5. The calciner 3 is of the turbulent counterflow type. That is, the combustion gases from the rotary kiln 2 as well as the high temperature gases discharged from a clinker cooler are introduced into the calciner 3 so that the combustible materials are completely burned by the auxiliary burner 6 and are uniformly mixed with the preheated noncombustible materials charged from a cyclone immediately above the calciner 3 and so that the above two raw materials are calcined. The calcined materials are fed through the lowermost cyclone into the rotary kiln 2 as indicated by the broken-line arrow.

In order to prevent (1) the variation in ratio of the combustible cement materials which variation affects the quality of cement clinker and (2) the variation in calcination heat due to the variation in heating value of the combustible materials, the heating value of the combustible materials is limited to 400 Kcal per kilogram of clinker whereas the additional heat of 50 to 100 Kcal per kilogram of clinker required for complete calcination is supplied by the auxiliary burner 6. For this purpose, in response to the output signal from the temperature sensor 7 the degree of opening of the flow control valve 8 is controlled in a conventional automatic control method so that the temperature of gases discharged out of the calciner 3 may be maintained at a predetermined constant level.

Second Embodiment, FIG. 2

The second embodiment shown in FIG. 2 is substantially similar in construction to the first embodiment shown in FIG. 1 except that the calciner 3 is of the turbulent concurrent type and the combustion gases from the rotary kiln 2 are charged into the lowermost cyclone not into the calciner 3. The mode of operation is substantially similar to that of the first embodiment so that no further description shall be made.

Third Embodiment, FIG. 3

The third embodiment shown in FIG. 3 is also substantially similar in construction to the first embodiment except that the calciner 3 is of the concurrent type. In the third embodiment, the combustion gases from the rotary kiln are introduced through a duct into the lowermost cyclone. This duct is provided with the inlet 5 of combustible cement materials and the auxiliary burner 6 so that it may function as the calciner 3. The mode of operation is also substantially similar to that of the first embodiment.

In summary, according to the present invention, the noncombustible cement materials are introduced into the preheater while the combustible cement materials, into the calciner in such a quantity that the heating value of the combustible cement materials is less than the heat required for preheating and calcining the whole cement materials. To supply the additional heat required for the complete preheating and calcining the whole cement materials the calciner is provided with the auxiliary burner. The temperature of the gases discharged from the calciner is detected by the temperature sensor at the outlet in order to detect the variation in heat requirement in the calciner and to automatically control the burning rate of the auxiliary burner depending upon the mixing ratio of the combustible cement materials and their heating value both of which will affect the quality of cement clinker. Therefore the cement firing apparatus including the preheater and the calciner may advantageously use the combustible materials such as oil shales as cement materials without causing any adverse effects on the safe operation. In addition, economy of fuel may be attained, the operation is simple and cement clinker with the uniform quality may be obtained.

What is claimed is:

1. A method for controlling the operation of an apparatus for preheating and calcining cement materials containing combustible materials comprising the steps of:
   (a) preheating noncombustible cement materials in a preheater and then introducing the preheated materials into a calciner,
   (b) introducing combustible cement materials into the calciner in such a quantity that the heating value of the combustible cement materials may be less than the heat required for the complete preheating and calcining of both cement materials,
   (c) burning the combustible materials in the cement materials and supplying additional heat to said calciner in an amount required for the complete preheating and calcining of both cement materials,
   (d) detecting in terms of the variation of temperature of the gases at an outlet of said calciner the variation in required calcination heat which in turn is caused by the variation in mixing ratio of the combustible cement materials and the variation in heating value thereof,
   (e) automatically controlling the additional heat supplied to said calciner in response to the detected temperature of gases, and
   (f) introducing the calcined material into the kiln and burning the material introduced therein to form cement clinker.

2. A method as set forth in claim 1 wherein the heat required for the complete preheating and calcining of both cement materials is set to 450 to 500 Kcal per kilogram of clinker, the heating value of the combustible cement materials is set less than about 400 Kcal per kilogram of clinker, and the additional heat supplied to said calciner is in the range of about 50 to 100 Kcal per kilogram of clinker.

* * * * *